July 7, 1970   J. MORTON   3,519,994
TELEMETERING SYSTEM AND DIAL READING DEVICE
Filed Nov. 29, 1967   2 Sheets-Sheet 1

INVENTOR
JOHN MORTON
BY
ATTORNEYS

July 7, 1970   J. MORTON   3,519,994

TELEMETERING SYSTEM AND DIAL READING DEVICE

Filed Nov. 29, 1967   2 Sheets-Sheet 2

INVENTOR
JOHN MORTON

ATTORNEYS

United States Patent Office 3,519,994
Patented July 7, 1970

3,519,994
TELEMETERING SYSTEM AND DIAL READING DEVICE
John Morton, Disley, England, assignor to The General Electric Company Limited, London, England, a British company
Filed Nov. 29, 1967, Ser. No. 686,506
Claims priority, application Great Britain, Nov. 30, 1966, 53,593/66
Int. Cl. H04q 9/00
U.S. Cl. 340—150    11 Claims

ABSTRACT OF THE DISCLOSURE

An arrangement for indicating in one-tenth revolution steps the angular position of a rotatable member having a number of circumferentially spaced magnets carried by the member which cooperate with four stationary cored-coils so that each core permeability state is momentarily varied each time a magnet is carried past the coil, the magnet and coil circumferential spacings being such as to produce ten different combinations of core permeability states per revolution of the member which combinations repeat for each revolution. The coils can control the outputs of electronic oscillators to produce binary code combinations of oscillator output signals which can be transmitted to a remote point and decoded for indicating at that point the angular position of the member.

---

This invention relates to arrangements for producing output signals representative at any time of the number of steps, each consisting of a tenth of a revolution, through which a member rotatable about an axis has rotated from a given datum position. More particularly, although not exclusively, the invention is concerned with an electrical circuit arrangement for indicating the reading of a decade counter in binary-coded form at a remote point.

According to the invention, an arrangement for producing output signals representative at any time of the number of steps, each consisting of a tenth of a revolution, through which a member rotatable about an axis has rotated from a given datum position includes a number of permanent magnets mounted on the rotatable member so as each to be carried along the same circular path when the member rotates, and four coils, each wound on a core of magnetic material, located at relatively fixed positions each adjacent to said circular path so that the permeability of each coil core is momentarily varied by the field of the permanent magnet each time a said permanent magnet is carried past the coil core as the member rotates, the coils and magnets being spaced in such different 36° zones around said circular path as to produce ten different combinations of coil core permeability states during each complete rotation of the member, which combinations are repeated for each rotation of the member.

The invention rests on the discovery that although four coil cores would normally assume sixteen different combinations of permeability states, it is nevertheless possible by disposing a number of permanent magnets in suitably selected 36° zones around said circular path to produce only ten combinations which repeat in successive rotations of the member. Then by connecting the coils into electric circuit arrangements each designed to produce an output electric signal whose value depends on the value of the coil inductances, which themselves depend on the value of the core permeabilities, ten different combinations of output signals can be obtained each representative of a different angular position of the rotatable member.

The electric circuit arrangements can conveniently be oscillators whose output amplitude, or frequency or phase can be arranged to be controlled by the coil inductances so that the momentary variations in one of these parameters provide the output signals. Such signals can readily be transmitted to a remote point for decoding of the signal combinations to provide a desired indication at the remote point of the angular position of the rotatable member.

Figure 1:
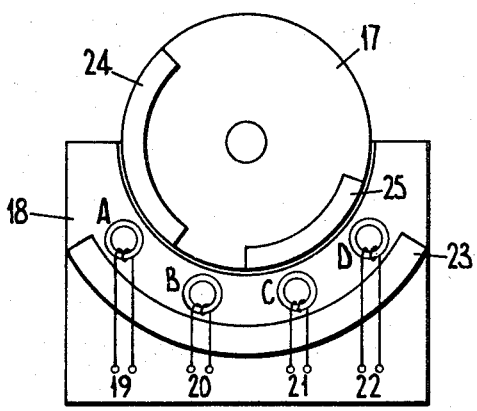
Figure 2:
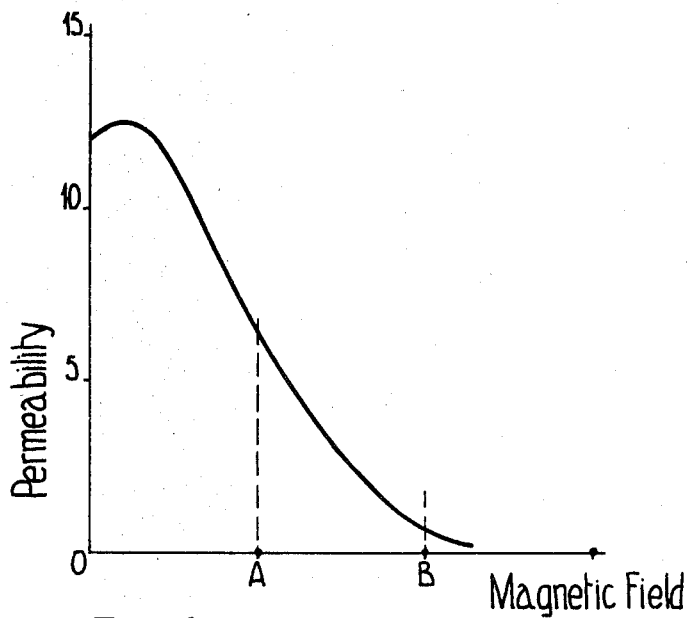
Figure 3:
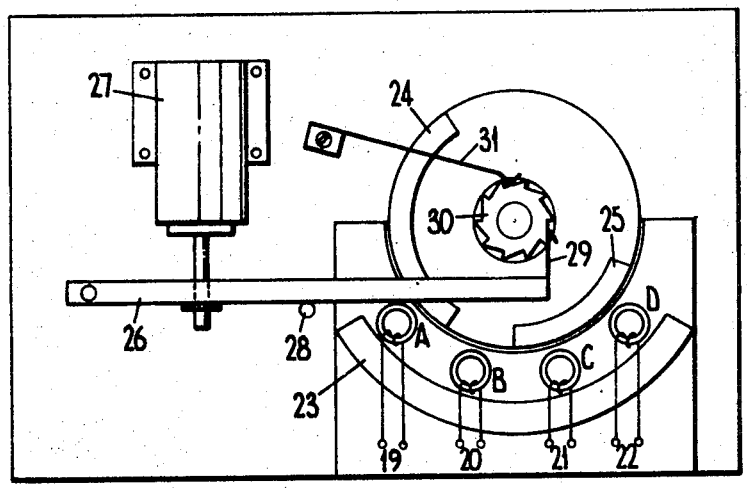
Figure 4:
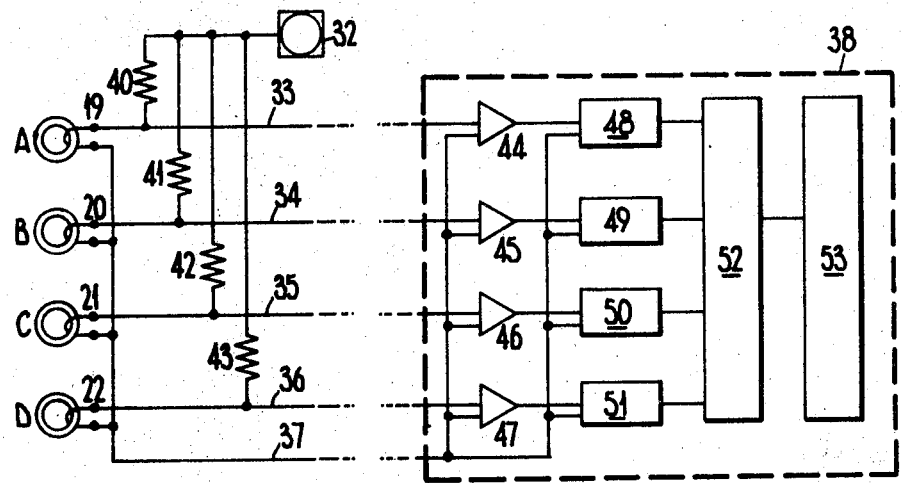
Figure 5:
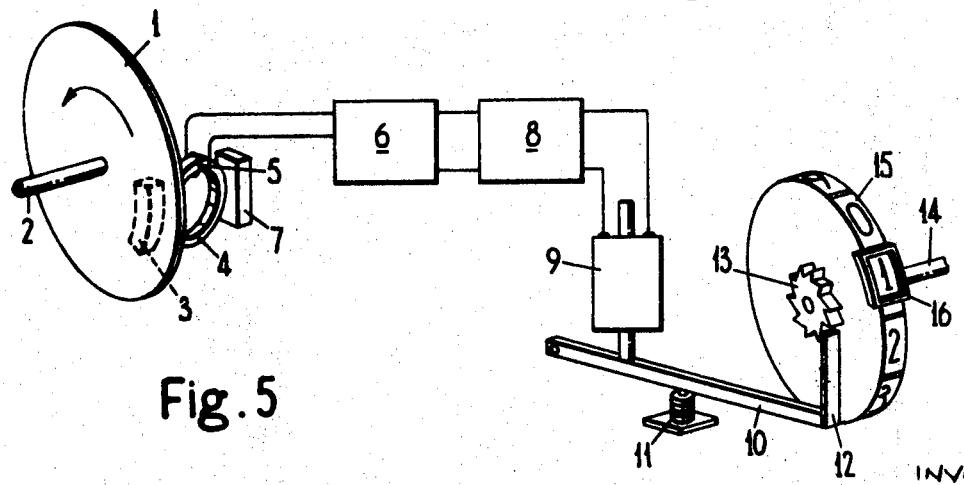

The invention will be further described with reference to the accompanying drawings, in which:

FIG. 1 shows one arrangement in accordance with it,
FIG. 2 is explanatory of a feature of the arrangement of FIG. 1,
FIG. 3 shows the use of the arrangement of FIG. 1 in the decade counter of an electrical watt-hour meter,
FIG. 4 shows in schematic form an electric circuit arrangement for the transmission of angular position indicating signals to a remote point, and
FIG. 5 shows an arrangement for the initial driving of a decade counter similar to that of FIG. 3.

Referring now to FIG. 1, this shows a wheel 17 arranged to rotate wthin a circular recess in a board 18 which carries four coils wound on toroidal cores, the coil/core assemblies being hereafter referred to as the coils A, B, C, D and being connected respectively to terminals 19, 20, 21, 22 on the board for connection into an oscillator and detector circuit arrangement which will be described later.

The coils A, B, C, D are arranged around the periphery of the wheel 17, and regarding the wheel as comprising ten segments each of angle 36°, are located opposite four adjacent segments. An arcuate ferrite magnet 23 is mounted on the board 18 externally of the coils for applying a coil-biasing field (the purpose of which will be described later), and for producing the required ten signal combinations in the coil outputs, the wheel 17 carries two arcuate ferrite magnets at its periphery, one 24 extending over three segments and the other 25 extending over two segments separated by one segment from the magnet 24.

Regarding the juxtaposition of one of the magnets 24 or 25 with a coil as corresponding to the production of a "1" binary signal and the absence of both of the magnets as corresponding to "0," then considering the successive positions for ten rotations anti-clockwise of the wheel each through 36°, starting with the position shown, the following combinations of output signals are produced:

| Position | Coil | | | |
|---|---|---|---|---|
| | A | B | C | D |
| 1 | 1 | 0 | 1 | 1 |
| 2 | 1 | 1 | 0 | 1 |
| 3 | 1 | 1 | 1 | 0 |
| 4 | 0 | 1 | 1 | 1 |
| 5 | 0 | 0 | 1 | 1 |
| 6 | 0 | 0 | 0 | 1 |
| 7 | 0 | 0 | 0 | 0 |
| 8 | 1 | 0 | 0 | 0 |
| 9 | 1 | 1 | 0 | 0 |
| 10 | 0 | 1 | 1 | 0 |

However, many other different arrangements of the core coils and of permeability-changing magnets carried by the wheel can be used for producing a similar result.

Thus numbering the wheel segments 1 to 10 anti-clockwise, so that the coils A, B, C, D lie opposite segments 1 to 4 respectively, similar results (but with different "0" and "1" combinations) can be obtained with only four permeability-changing magnets occupying segments 10, 7, 6, 5 or 10, 8, 5, 4 respectively. Alternatively, five permeability-changing magnets in segments 10, 8, 7, 6, 5 would also suffice.

The four coils need not necessarily be located opposite adjacent segments. Thus with coils opposite segments 10,

2, 3, 4 permeability-changing magnets in segments 1, 9, 8, 7 and 5 would provide the necessary ten different codings.

Similarly coils opposite segments 3, 4, 6, 10 could cooperate with magnets in segments 1, 3, 4, 5, 10 or coils opposite segments 1, 3, 5, 7 could cooperate with magnets in segments 2, 3, 4, 6, 7, 8, and other suitable combinations can be found.

The purpose of the biassing magnet 23 will now be explained. Briefly stated, it is to enable the ratio of maximum to minimum value in the parameter of the oscillator output, the changes in which provide the signal pulses (which ratio is hereinafter referred to as the signal pulse amplitude) to be as high as possible.

For this purpose, use is made of the fact that for most magnetic materials suitable for providing coil cores, the characteristic curve relating to the value of the permeability of the material to an external magnetic field applied to it shows an initial increase in permeability from the zero field value followed by a progressive fall to zero at the saturation field value.

A typical such characteristic for a ferrite material is shown in FIG. 2 of the accompanying drawings in which the ordinates represent the permeability values and the abscissae the values of the externally applied magnetic field on an arbitrary uniform scale.

It will be seen that if the value of the external field changes from 0 to A the change in the permeability is from 12 to 6, i.e. in the ratio of 12/6=2, whereas if the applied field then increases from A to B, the further change in the permeability is from 6 to 0.5, i.e. in the ratio of 6/0.5=12.

Thus a greater change in the ratio of initial to final value of the permeability can be produced by a given externally applied magnetic field if a biassing field is also constantly applied to the material so as to carry the initial operating point on the permeability characteristic (corresponding to the absence of the given externally applied field) to a suitable position away from the zero field value.

Since the inductance of a coil wound on a core of the magnetic material varies with the permeability of the material, and the value of the frequency or other oscillator output parameter, the changes in which provide the output signal, can be arranged to be controlled by the variation in coil inductance, it follows that an increase in the signal pulse amplitude can be obtained by applying a biassing magnetic field constantly to the coil core.

Each coil A, B, C, or D can be associated with a biassing magnet and these magnets can, as shown, be provided by different parts of a single magnet 23; for preventing undue torque being exerted on the wheel 17 arising from asymmetry of the magnet arrangement, it might in some cases be desirable for a single biassing magnet to extend round the whole of the wheel.

Referring now to FIG. 2, this shows the arrangement of FIG. 1 arranged to be driven by actuation of a driving arm 26 linked to the plunger of a solenoid 27. The arm 26 is arranged to return under its own weight to a position of rest against a stop 28 and carries at its end a finger 29 arranged to engage with a ratchet wheel 30 fixed to the wheel 17 for rotation about the same axis. The ratchet wheel 30 also engages a spring retaining arm 31 for holding it in each of the successive positions, ten per revolution, to which it is rotated by operation of the driving arm 26.

FIG. 4 indicates schematically one method of connection of the coils A, B, C, D into a coding transmission and decoding circuit designed for sending to a remote point signals representative of the angular position of the wheel 17.

The coils A, B, C, D are connected via the terminals 19, 20, 21, 22 into the circuit of an oscillator 32 designed when no permeability-changing magnet cooperates with any of the coils to transmit an oscillation of given frequency over each of four lines 33, 34, 35, 36, cooperating with a common return line 37, connected to apparatus at a remote point indicated by the dotted enclosure 38; when one of the coils A, B, C, D cooperates with a permeability-changing magnet the transmitted frequency is changed, possibly by a different amount for each coil. The connections of the coils to the oscillator 32, and of the oscillator 32 to the transmission lines, are schematically represented as being through resistors 40, 41, 42, 43, and it will be understood that the oscillator 32 also contains whatever filters, amplifiers, etc. are required for the transmission of the output signals.

At the remote point 38, the lines 33 to 36 are connected through amplifiers 44, 45, 46, 47 and demodulators 48, 49, 50, 51 to a decoder 52 which produces an output representative of the "1" and "0" code combination fed to it and controls an indicator 53 which produces, possibly in numerical register form, an indication representative of the angular position of the wheel 17.

Where the wheel 17 is coupled with other wheels of a decade counter, each wheel is similarly associated with four coils and carries permeability-changing magnets, with the coils connected to control the output of an oscillator connected to the remote point so that a separate indication of the angular position of each wheel is received at the remote point and displayed by the indicator 53. Alternatively, the signals might be fed directly into a computer.

It will be appreciated that the board 18 carrying the coils A, B, C, D and biassing magnet 23 need not necessarily be secured permanently in position; it might, for example, form the head of a "read-out" unit which is brought into position adjacent to the wheel 17 only when it is desired to read the angular position of the wheel. Similarly a detachable "read-out" head consisting of a number of similar board units mounted side-by-side might be adapted to read simultaneously the angular positions of each of the wheels of a multiple linked-wheel decade counter, and the same head can then be used with any number of different counters. By suitably mounting such a counter within a closed housing, it can be arranged that the reading can be effected by bringing the head up to the exterior of the housing.

FIG. 5 shows how the initial drive for a watt-hour meter counter can be derived from a rotatable wheel 1 in the meter driven by the meter mechanism.

Referring now to FIG. 5, this shows the wheel 1 which is arranged to rotate about an axis 2 and carries near its periphery a permanent magnet 3 in the form of a block of ferrite material which is arranged to pass near the toroidal ferrite core 4 of a coil 5 once in each revolution of the wheel.

The coil 5 forms part of the circuit of an oscillator represented by the block 6, such that the frequency of the oscillator output oscillation is changed by the same amount each time the core 4 is subjected to the field of the magnet 3, and returns to the original value when the magnet 3 is carried away from the core 4. The core 4 is constantly subjected to a biassing magnetic field produced by a permanent magnet in the form of a block of ferrite material 7.

The oscillator output is connected to an amplifier-demodulator-rectifier 8 arranged to produce a direct current output which varies in magnitude when the oscillator output frequency changes. The output of 8 is connected to a solenoid 9 which is arranged to be operated so as to cause its plunger to pull up a driving arm 10 when the direct current has the value corresponding to the juxtaposition of the magnet 3 with the core 4. At the lower value of direct current obtaining when the magnet 3 is away from the core 4, the arm 10 is retracted by a spring 11.

The arm 10 carries a finger 12 which engages with a toothed wheel 13 so as to turn the wheel through one tooth position each time the arm is pulled upwardly by the solenoid 9.

The toothed wheel 13 is arranged to rotate on a shaft 14 and is fixed to a counter drum 15 arranged to rotate on the same shaft and to display through a window 16 a different one of the digits 0 to 9, marked on the periphery of the drum, each time the toothed wheel 13 is turned by the arm 10.

The drum 15 is coupled to further counter drums (not shown) to form a decade counter which indicates the total number of revolutions of the wheel 1.

The coil assembly 4, 5, 7 together with the oscillator 6, and possibly the amplifier-demodulator-rectifier 8, can be located in the meter housing, but if desired the solenoid 9 and counter assembly 10 to 16 can be located at a point remote from the meter and connected to it by suitable wiring. In some cases it may be more convenient or desirable to locate some or all of the parts denoted by the block 8, and possibly also the oscillator 6, at the remote point. The latter might be, for example, the basement of a block of flats in which counters connected to the individual meters in the flats are located together for ease of reading.

Although the arrangements of FIGS. 1, 3, 4, 5 have been described with reference to the use of permeability biasing magnets, it will be appreciated that they could also operate without such magnets and it will be understood that these and similar angular position indicating arrangements designed to operate without the biassing magnets are included within the scope of the present invention.

Also the method of securing only ten binary code combinations from four coils cooperating with permeability-changing magnets carried by a wheel, for each revolution of the wheel, might find use in many different types of systems required to produce an indication of ten different uniformly spaced angular positions of a rotating wheel or other body, and it will be understood that all such uses, with or without the inclusion of biassing magnets for the coils, are included within the scope of the present invention.

I claim:

1. An arrangement for producing output signals representative at any time of the number of steps, each consisting of a tenth of a revolution, through which a member rotatable about an axis has rotated from a given datum position, including a number of permanent magnets mounted on the rotatable member so as each to be carried along the same circular path when the member rotates, and four coils, each wound on a core of magnetic material, located at relatively fixed positions each adjacent to said circular path so that the permeability of each coil core is momentarily varied by the field of the permanent magnet each time a said permanent magnet is carried past the coil core as the member rotates, the coils and magnets being spaced in such different 36° zones around said circular path as to produce ten different combinations of coil core permeability states, and hence ten different combination of coil inductance values, during each complete rotation of the member, which combinations are repeated for each rotation of the member.

2. An arrangement according to claim 1, wherein the coils occupy successive 36° zones adjacent to the rotatable member and permanent magnets are arranged in three successive 36° zones on the member spaced by one empty zone from two further successive 36° zones on the member in which further permanent magnets are arranged.

3. An arrangement according to claim 2, in which the three successive permanent magnets on the rotatable member are provided by different regions of a single permanent magnet and the further two successive permanent magnets on the rotatable member are provided by different regions of a second single permanent magnet.

4. An arrangement according to claim 1, wherein each of the coil cores has positioned adjacent to it a permeability-biassing permanent magnet the effect of which is to adjust the operating point on the core permeability characteristic so as to increase the value of the ratio maximum to minimum permeability produced when a permanent magnet on the rotatable member is carried past the core.

5. An arrangement according to claim 4, wherein the four coil permeability-biassing magnets are provided by different regions of a single permanent magnet embracing all the coils.

6. An arrangement in accordance with claim 1, wherein the coils are connected into electric circuit arrangements each designed to produce an output whose value depends on the value of the respective coil inductance.

7. An arrangement according to claim 6, wherein the electric circuit arrangements are oscillators having the coils connected in output control circuits thereof such that the oscillator outputs are determined by the coil core permeabilities.

8. An arrangement according to claim 7, wherein the oscillator outputs are connected to decoding means located at a point remote from the rotatable member so that the angular position thereof can be determined at the remote point.

9. An arrangement according to claim 1, wherein the coils and any biassing magnets therefor are mounted to form a unit which is separable from the rotatable member but can be applied thereto for reading the angular position thereof when required.

10. A multiple decade counter each of the linked rotatable elements of which forms part of an angular position indicating arrangement in accordance with claim 1.

11. An electrical watt-hour meter the decade counter of which is in accordance with claim 10.

References Cited

UNITED STATES PATENTS

| 2,855,585 | 10/1958 | Quinby | 340—204 XR |
| 3,266,018 | 8/1966 | Higgins | 340—151 |
| 3,391,274 | 7/1968 | Avery | 235—92 |

DONALD J. YUSKO, Primary Examiner

U.S. Cl. X.R.

340—195, 204, 347, 357